United States Patent
Okuma et al.

(10) Patent No.: US 9,194,495 B2
(45) Date of Patent: Nov. 24, 2015

(54) FLUID PRESSURE APPARATUS

(75) Inventors: Masahiro Okuma, Kitasoma-gun (JP); Yasunaga Suzuki, Kitakatsushika-gun (JP)

(73) Assignee: SMC KABUSHIKI KAISHA, Tokyo (JP)

( * ) Notice: Subject to any disclaimer, the term of this patent is extended or adjusted under 35 U.S.C. 154(b) by 888 days.

(21) Appl. No.: 13/107,312

(22) Filed: May 13, 2011

(65) Prior Publication Data

US 2011/0283883 A1 Nov. 24, 2011

(30) Foreign Application Priority Data

May 19, 2010 (JP) .................................. 2010-115077

(51) Int. Cl.
*F16J 15/16* (2006.01)
*F15B 15/14* (2006.01)
*F16J 15/56* (2006.01)

(52) U.S. Cl.
CPC ............ *F16J 15/164* (2013.01); *F15B 15/1452* (2013.01); *F16J 15/166* (2013.01); *F16J 15/56* (2013.01)

(58) Field of Classification Search
CPC ...................................................... F16J 15/166
USPC ............ 277/443, 441, 468; 92/248, 249, 257, 92/258
See application file for complete search history.

(56) References Cited

U.S. PATENT DOCUMENTS

| | | | | |
|---|---|---|---|---|
| 2,068,859 A | * | 1/1937 | Jones et al. | 92/258 |
| 2,349,170 A | * | 5/1944 | Jackman | 277/488 |
| 2,460,948 A | * | 2/1949 | Sander | 92/258 |
| 2,765,204 A | | 10/1956 | Josephson | |
| 3,158,072 A | * | 11/1964 | Detrez | 92/258 |
| 3,473,814 A | | 10/1969 | Frank Bastow | |
| 3,582,094 A | | 6/1971 | Whittaker | |
| 3,583,712 A | | 6/1971 | Domros et al. | |
| 3,636,824 A | * | 1/1972 | Clark | 277/468 |
| 3,771,801 A | | 11/1973 | Burke | |
| 3,920,252 A | | 11/1975 | Dechavanne | |
| 4,059,280 A | | 11/1977 | Eastwood | |

(Continued)

FOREIGN PATENT DOCUMENTS

| CN | 2474811 Y | 1/2002 |
|---|---|---|
| CN | 1380505 A | 11/2002 |

(Continued)

OTHER PUBLICATIONS

Office Action mailed Feb. 12, 2014, in co-pending U.S. Appl. No. 13/107,285.

(Continued)

*Primary Examiner* — F. Daniel Lopez
(74) *Attorney, Agent, or Firm* — Oblon, McClelland, Maier & Neustadt, L.L.P.

(57) ABSTRACT

A fluid pressure apparatus includes a piston, and a packing provided on an outer circumference of the piston. The packing includes a support ring made of a low-friction material, and a ring-shaped seal member mounted to the support ring. When at least a certain amount of transverse load acts on the piston, an outer circumferential surface of the support ring abuts against an inner circumferential surface of the slide hole, whereby the piston is prevented from contacting with the inner circumferential surface of the slide hole.

5 Claims, 7 Drawing Sheets

(56) References Cited

U.S. PATENT DOCUMENTS

| | | | |
|---|---|---|---|
| 4,079,951 A * | 3/1978 | Sievenpiper | 277/468 |
| 4,177,837 A | 12/1979 | Frank et al. | |
| 4,179,131 A * | 12/1979 | Nussbaumer | 277/468 |
| 4,305,595 A | 12/1981 | Miyagishima et al. | |
| 4,484,512 A | 11/1984 | Dechavanne | |
| 4,496,161 A * | 1/1985 | Fischer | 277/311 |
| 4,576,386 A | 3/1986 | Benson et al. | |
| 4,577,874 A | 3/1986 | Zitting | |
| 4,614,348 A | 9/1986 | Fournier | |
| 5,014,603 A | 5/1991 | Navarette et al. | |
| 5,385,081 A | 1/1995 | Sneddon | |
| 5,390,939 A | 2/1995 | Terauchi et al. | |
| 5,524,905 A | 6/1996 | Thoman et al. | |
| 5,879,010 A | 3/1999 | Nilkanth et al. | |
| 6,173,964 B1 | 1/2001 | Bell et al. | |
| RE42,654 E | 8/2011 | Zitting | |
| 8,246,055 B2 | 8/2012 | Asplund et al. | |
| 2011/0283880 A1 | 11/2011 | Okuma et al. | |

FOREIGN PATENT DOCUMENTS

| | | | |
|---|---|---|---|
| CN | 101535693 A | | 9/2009 |
| CN | 201416636 Y | | 3/2010 |
| EP | 0048707 A2 | | 3/1982 |
| EP | 0219689 A2 | | 4/1987 |
| GB | 1 274 999 | | 5/1972 |
| GB | 1 316 841 | | 5/1973 |
| GB | 1 512 181 | | 5/1978 |
| GB | 2077368 A | | 12/1981 |
| JP | 46-3861 | | 11/1971 |
| JP | 53-65553 | | 6/1978 |
| JP | 60-121560 U | | 8/1985 |
| JP | 61-32862 U | | 2/1986 |
| JP | 63-16925 | | 5/1988 |
| JP | 5-505012 A | | 7/1993 |
| JP | 8-326914 A | | 12/1996 |
| JP | 9-72310 | | 3/1997 |
| JP | 2000-74009 A | | 3/2000 |
| JP | 2003-120602 | | 4/2003 |

OTHER PUBLICATIONS

Japanese Office Action issued Mar. 4, 2014 in Patent Application No. 2010-115079 with Partial English Translation.
U.S. Appl. No. 13/107,230, filed May 13, 2011, Okuma, et al.
U.S. Appl. No. 13/107,285, filed May 13, 2011, Okuma, et al.
Office Action issued Jan. 7, 2014 in Japanese Patent Application No. 2010-115074 with partial English language translation.
Office Action issued Jan. 7, 2014 in Japanese Patent Application No. 2010-115077 with partial English language translation.
Combined Chinese Office Action and Search Report issued Jul. 3, 2014 in Patent Application No. 201110141493.7 (with English language translation).
Combined Chinese Office Action and Search Report dated Jul. 23, 2014, in Chinese Patent Application No. 201110145285.4 (with English Translation).
Combined Chinese Office Action and Search Report dated Jul. 25, 2014, in Chinese Patent Application No. 201110145289.2 (with English Translation).

* cited by examiner

FLUID PRESSURE APPARATUS

CROSS-REFERENCE TO RELATED APPLICATION

This application is based upon and claims the benefit of priority from Japanese Patent Application No. 2010-115077 filed on May 19, 2010, of which the contents are incorporated herein by reference.

BACKGROUND OF THE INVENTION

1. Field of the Invention

The present invention relates to a fluid pressure apparatus of a fluid pressure cylinder or a fluid changeover valve or the like, and more specifically, concerns a fluid pressure apparatus in which an improved packing is installed to a partitioning member comprising a piston or a spool or the like, which moves in the interior of a slide hole defined in a housing.

2. Description of the Related Art

A fluid pressure cylinder generally includes a piston that moves in an axial direction along the interior of a slide hole formed in a housing. A packing (o-ring) made of an elastic rubber material is installed on the outer circumference of the piston, such that through the packing, sealing is effected between the inner circumference of the slide hole and the outer circumference of the piston (For example, see Japanese Laid-Open Patent Publication No. 09-072310 and Japanese Laid-Open Patent Publication No. 2003-120602).

Further, in such conventional techniques, together with the packing, a wear ring is provided on the piston, the wear ring being made from a material (e.g., a synthetic resin) having a hardness greater than that of the packing and which is superior in terms of slidability. In the case that a transverse load acts on the piston in a direction tending to cause misalignment between the axis of the slide hole and the axis of the piston (i.e., in a direction perpendicular to the piston axis), misalignment of the piston axis is suppressed by the wear ring, and excessive deformation of the packing due to pressing of the inner surface of the slide hole against the packing is prevented. Also, the outer circumference of the piston is prevented by the wear ring from coming into contact with the inner circumference of the slide hole.

SUMMARY OF THE INVENTION

However, in such conventional techniques, since the packing and the wear ring are both installed to the piston, the number of parts is large, thereby making the sealing section complicated in structure. Also, since the packing and the wear ring are arranged on the piston in the axial direction of the piston at an interval, the size of the piston in the axial direction is large.

The present invention has been made in view of the above problems, and an object of the present invention is to provide a fluid pressure apparatus including a packing which has a function to prevent a partitioning member such as a piston from coming into contact with the inner circumference of the slide hole and which is capable of simplifying the structure of a sealing section and curbing the increase in the size of the piston in the axial direction.

To achieve the above object, the invention of the present application is characterized by a fluid pressure apparatus comprising: a housing including a slide hole formed therein; a partitioning member that moves in an axial direction along an interior of the slide hole; and a packing that is installed on an outer circumference of the partitioning member, wherein the packing comprises: a ring-shaped support ring made of a low-friction material and having an annular seal installation groove on an outer circumference side; and a ring-shaped seal member made of an elastic material and which is installed in the seal installation groove, an outer circumference of the seal member protruding outwardly from the support ring and contacting with an inner circumferential surface of the slide hole, wherein the support ring is formed by integrally combining side walls and a bottom wall, the side walls supporting both sides of the seal member, the bottom wall connecting inner ends of both the side walls, and wherein when a transverse load does not act on the partitioning member, an outer circumferential surface of the support ring is out of contact with the inner circumferential surface of the slide hole, and when a transverse load having a certain value or more acts on the partitioning member, the outer circumferential surface of the support ring abuts against the inner circumferential surface of the slide hole, whereby the partitioning member is prevented from contacting with the inner circumferential surface of the slide hole.

With the above structure, when a transverse load acts on the piston, the outer circumference of the support ring is in contact with the inner circumferential surface of the slide hole, whereby a transverse displacement of the piston is regulated. As a result, the seal member is prevented from excessively deforming, and the piston is prevented from contacting with the inner circumferential surface of the slide hole. Thus, since the support ring has at least functions equivalent to those of a conventional wear ring, it is not necessary to arrange a separate wear ring together with the packing at an interval in the direction of the axis of the piston. Accordingly, the present invention is simple in structure, and increase in the size of the piston in the direction of the axis can be suppressed. Also, since the support ring is formed by combining two side walls and a bottom wall integrally, the number of parts is small and thus the structure thereof can be simplified. Further, since the support ring is formed as an integrated structure, strength thereof against a transverse load can be enhanced.

In the fluid pressure apparatus of the present invention, the partitioning member may include an annular packing installation groove formed in an outer circumference thereof, and the support ring may be installed in the packing installation groove. In this case, a ring-shaped second seal member may be interposed between the inner circumferential surface of the support ring and the packing installation groove. With the structure, an interface between the inner circumference of the packing and the groove bottom of the packing installation groove is sealed, whereby flow of fluid therebetween is blocked. Thus, the decrease in efficiency of the fluid pressure apparatus is effectively prevented.

In the fluid pressure apparatus of the present invention, the support ring may be tiltably installed in the packing installation groove, and when a transverse load acting on the partitioning member is equal to or less than a certain value, an axis of the partitioning member may be inclined to an axis of the slide hole, but an axis of the support ring may be kept parallel to the axis of the slide hole. Thus, even when a small transverse load acts on the piston, since the outer circumferential surface of the support ring is in surface contact with the inner circumferential surface of the slide hole. Therefore, sliding resistance therebetween can be prevented from excessively increasing.

In the fluid pressure apparatus of the present invention, the support ring may be formed on the outer circumference of the partitioning member by mold-forming. With the structure, since the support ring is mold-formed, sealing performance between the outer circumference of the piston and the inner circumference of the slide hole is enhanced, and the decrease in efficiency of the fluid pressure apparatus is further effectively prevented.

Therefore, the fluid pressure apparatus according to the present invention has advantageous effects that the fluid pressure apparatus has a function to prevent a partitioning member from coming into contact with the inner circumference of the slide hole and which is capable of simplifying the structure of a sealing section and curbing the increase in the size of the piston in the axial direction.

The above and other objects features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Preferred embodiments of a fluid pressure apparatus according to the present invention shall be presented and described in detail below with reference to the accompanying drawings.

Figure 1:
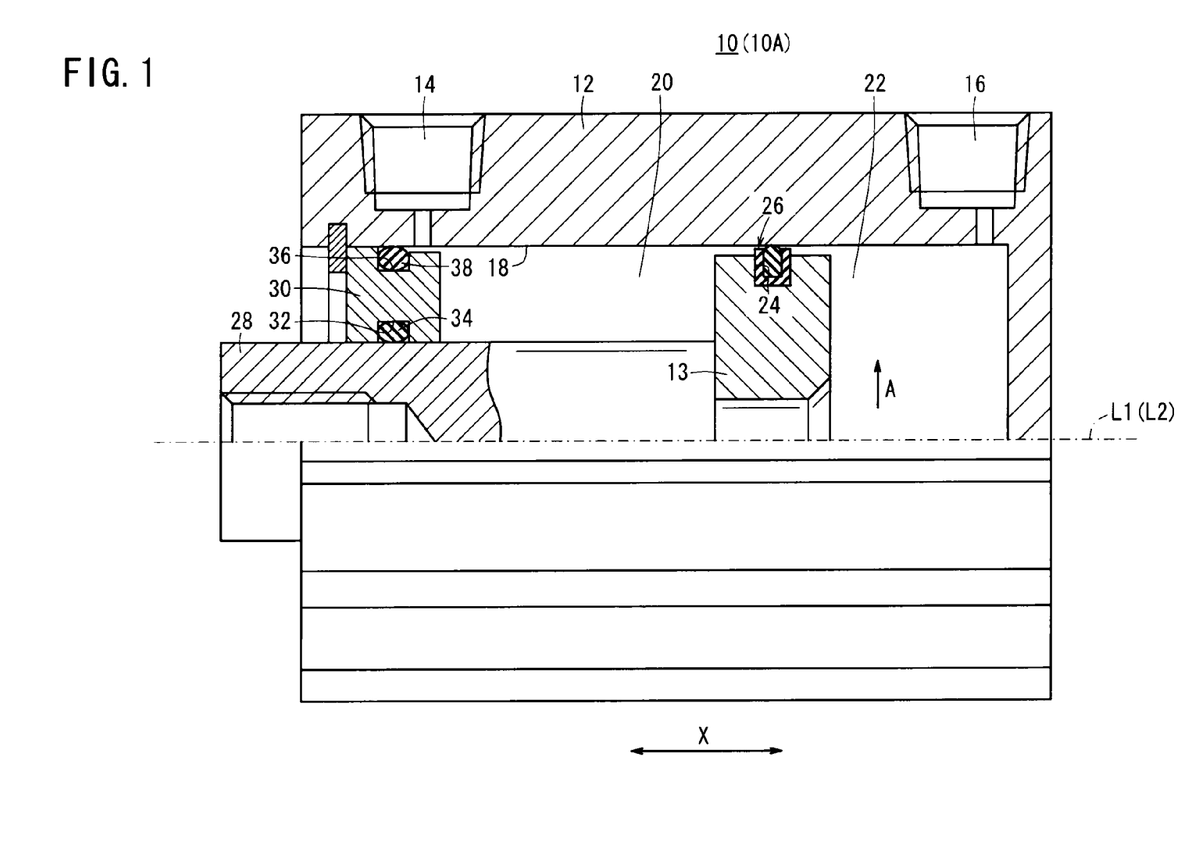
FIG. 1 is a partial cross sectional side view of a fluid pressure apparatus according to a first embodiment of the present invention.

FIG. 1 is a partial cross sectional side view of a fluid pressure apparatus 10 according to a first embodiment. In the present embodiment, the fluid pressure apparatus 10 is constructed as a fluid pressure cylinder 10A in which a piston 13 reciprocates in a housing 12. The fluid pressure cylinder 10A includes a housing 12 made from a metallic material such as an aluminum alloy or the like, which is equipped with a pair of ports 14, 16, and a slide hole 18 that communicates between the pair of ports 14, 16, the slide hole 18 forming the interior of the housing 12. In the interior of the slide hole 18, there is provided a piston 13 made from a metallic material.

In FIG. 1, reference character L1 denotes an axis of the piston 13, and reference character L2 denotes an axis of the slide hole 18. In a state shown in FIG. 1, the axis L1 of the piston 13 coincides with the axis L2 of the slide hole 18. The piston 13 is accommodated in the housing 12. The piston 13 is a displacement body which can be displaced in directions of the axis L2 of the slide hole 18 (indicated by an arrow X in FIG. 1) while partitioning the interior of the slide hole 18 into two pressure chambers, i.e., a pressure chamber 20 on the port 14 side and a pressure chamber 22 on the port 16 side. Stated otherwise, the piston 13 according to the present embodiment forms a partitioning member which is displaced in directions of the axis L2 in the slide hole 18.

A packing installation groove 24 is formed on the outer circumference of the piston 13, with a ring-shaped or annular packing 26 made of an elastic rubber material being installed in the packing installation groove 24. By means of the packing 26, an interface between the outer circumferential surface of the piston 13 and the inner circumferential surface of the slide hole 18 is sealed. Further, a base end portion of a piston rod 28 is connected to the piston 13, whereas a distal end portion of the piston rod 28 penetrates through a rod cover 30 that blocks one end of the slide hole 18 and extends externally outside of the slide hole 18.

A seal member 34, which forms a seal between the inner circumferential surface of the rod cover 30 and the outer circumferential surface of the piston rod 28, is installed in an annular groove 32 formed in an inner circumference of the rod cover 30. Further, another seal member 38, which forms a seal between the outer circumferential surface of the rod cover 30 and the inner circumferential surface of the slide hole 18, is installed in an annular groove 36 formed in the outer circumference of the rod cover 30.

Additionally, by supplying and discharging a pressure fluid such as compressed air or the like alternately to and from interiors of the two pressure chambers 20, 22 through the two ports 14, 16, the piston 13 is made to undergo reciprocating movements in the directions of the axis L2 of the slide hole 18 so as to advance and retract the piston rod 28. In some cases, the piston 13 is subjected to a transverse load. The transverse load is defined as a sideways force (force in a direction indicated by an arrow A in FIG. 1) that acts on the piston 13 through the piston rod 28, from a working member connected to the distal end of the piston rod 28, whereby the force tends to shift or incline the axis L1 of the piston 13 away from the axis L2 of the slide hole 18.

Figure 2A:
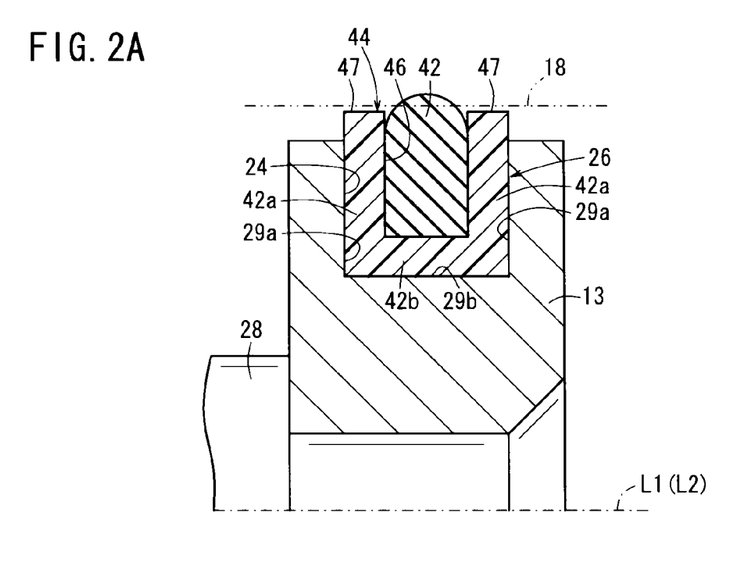
FIG. 2A is a fragmentary cross sectional view of a piston and a packing when the packing is installed in an annular groove, but the piston is not inserted in a slide hole.
Figure 2B:
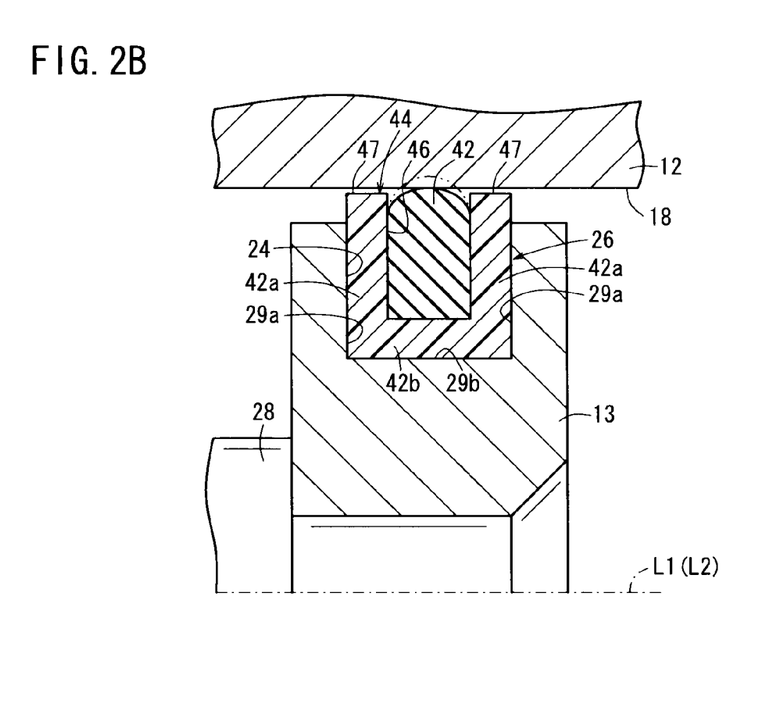
FIG. 2B is a fragmentary cross sectional view of the packing and locations proximate thereto when a transverse load does not act on the piston.

FIGS. 2A and 2B are fragmentary cross sectional views showing the packing 26 and locations proximate thereto. FIG. 2A shows the piston 13 and the packing 26 in a state where the packing 26 is installed in the annular groove but the piston 13 is not inserted into the slide hole 18. FIG. 2B shows the piston 13 and the packing 26 when no transverse load acts on the piston 13.

The packing installation groove 24 is a groove surrounded on three sides by left and right side walls 29a and a groove bottom 29b. The left and right side walls 29a make up flat surfaces, respectively, perpendicular to the axis L1 of the piston 13 and which are arranged mutually in parallel. The groove bottom 29b makes up a surface, which is aligned parallel to the direction of the axis L1 of the piston 13. Accordingly, the packing installation groove 24 overall has a uniform groove width and a uniform depth.

The packing 26 includes a ring-shaped support ring 44 and a ring-shaped seal member 42. The support ring 44 is installed in the packing installation groove 24 of the piston 13 concentrically with the piston 13. The support ring 44 is formed by combining side walls 42a and a bottom wall 42b integrally, the side walls 42a supporting both sides of the seal member 42, the bottom wall 42b connecting inner ends of both the side walls 42a.

In the support ring 44, there is provided an annular seal installation groove 46 extending circumferentially over the entire circumference of the support ring 44 around the axis thereof, and which is open outwardly in directions of deformation. An outer circumferential surface of each side wall 42a forms a support surface 47. The support surfaces 47 are the outermost circumferential surface of the support ring 44, and are parallel to the axis L of the piston 13. The outer diameter of the support surfaces 47 is larger than that of the outermost circumferential surface of the piston 13. Thus, the support ring 44 protrudes from the outer circumferential surface of the piston 13 at positions corresponding to the side walls.

The support ring 44 is made of a low-friction material. Accordingly, the friction coefficient between the support ring 44 (more specifically, support surfaces 47) and the inner circumferential surface of the slide hole 18 is smaller than that between the seal member 42 and the inner circumferential surface of the slide hole 18. Such a low-friction material includes a synthetic resin material having a low friction and abrasion resistant property, such as, for example, polytetrafluoroethylene (PTFE), or a metallic material.

The seal member 42 is made of an elastic material (for example, a rubber material), and comprises an annular member extending circumferentially over the entire circumference around the axis. The seal member 42 is installed in the seal installation groove 46 of the support ring 44. The outer circumference of the seal member 42 protrudes radially outwardly from the support ring 44. Thus, as shown in FIG. 2B, when the piston 13 with the packing 26 installed therein is inserted into the slide hole 18, the seal member 42 is sandwiched between the inner circumferential surface of the slide hole 18 and the bottom of the seal installation groove 46. As a result, the seal member 42 is elastically compressed and deformed, and thus is brought into close contact with the inner circumferential surface of the slide hole 18 over the entire circumference thereof in the circumferential direction. As shown in FIG. 2A, the outermost circumference of the seal member 42 has a substantially circular arc shape in cross section in a natural state (i.e., a state where no compressing load acts on the seal member 42, and thus the seal member 42 does not deform).

The fluid pressure apparatus 10 according to the present embodiment is basically constructed as above, and operation and effects thereof will be described below.

As shown in FIG. 2B, in a state in which a transverse load does not act on the piston 13, the axis L1 of the piston 13 substantially coincides with the axis L2 of the slide hole 18. In this case, the seal member 42 is in abutment against the inner circumferential surface of the slide hole 18 over the entire circumference in the circumferential direction, and then is elastically compressed and deformed. On the other hand, since the outer diameter of the support ring 44 is smaller than the inner diameter of the slide hole 18, and the axis L1 of the piston 13 substantially coincides with the axis L2 of the slide hole 18, the support surfaces 47, which are the outer circumferential surface of the support ring 44, are out of contact with the inner circumferential surface of the slide hole 18. Under a state as shown in FIG. 2B, the piston 13 reciprocates along the directions of the axis L2 of the slide hole 18, and thus the outer circumferential surface of the seal member 42 moves in contact with respect to the inner circumferential surface of the slide hole 18.

Figure 3:
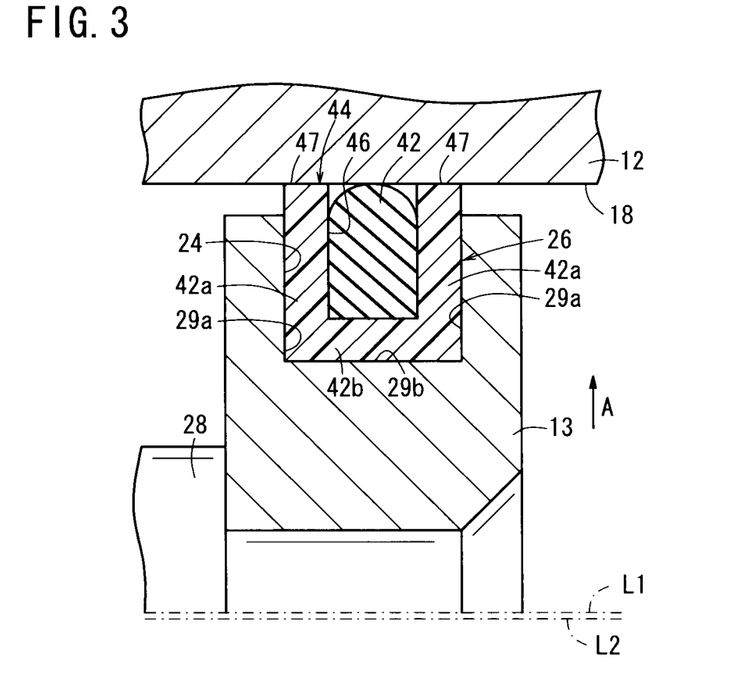
FIG. 3 is a fragmentary cross sectional view of the packing and locations proximate thereto when a transverse load acts on the piston.

As shown in FIG. 3, in a case where at least a certain amount of transverse load acts on the piston 13 in the direction indicated by an arrow A, since the seal member 42 is elastically deformable, the support ring 44 is displaced in the direction indicated by the arrow A, and the support surfaces 47 are brought into abutment against the inner circumferential surface of the slide hole 18. In this case, since the support surfaces 47 of the support ring 44 are positioned radially outside the outermost circumference of the piston 13, the outer circumference of the piston 13 is out of contact with the inner circumferential surface of the slide hole 18. Thus, the support ring 44 prevents the piston 13 from contacting with the inner circumferential surface of the slide hole 18.

As described above, according to the fluid pressure apparatus 10 of the present embodiment, when a transverse load acts on the piston 13, the outer circumference of the support ring 44 is in contact with the inner circumferential surface of the slide hole 18, whereby a transverse displacement of the piston 13 is regulated. Thus, the seal member 42 is prevented from excessively deforming, and the piston 13 is prevented from contacting with the inner circumferential surface of the slide hole 18. Accordingly, since the support ring 44 has at least functions equivalent to those of a conventional wear ring, it is not necessary to arrange a separate wear ring together with the packing on the piston 13 at an interval in the direction of the axis L1 of the piston 13. Therefore, the present invention is simple in structure, and increase in the size of the piston 13 in the direction of the axis L1 can be suppressed. Also, since the support ring 44 is formed by combining the two side walls 42a and the bottom wall 42b integrally, the number of parts is small, whereby the support ring 44 is simple in structure. Further, since the support ring 44 is formed as an integrated structure, strength thereof with respect to a transverse load is enhanced.

Next, a fluid pressure apparatus according to a second embodiment of the present invention will be described. Constituent elements of the fluid pressure apparatus according to the second embodiment, which have the same or similar functions or effects as those of the fluid pressure apparatus 10 according to the first embodiment, are designated by the same reference characters, and descriptions of such elements have been omitted.

Figure 4A:
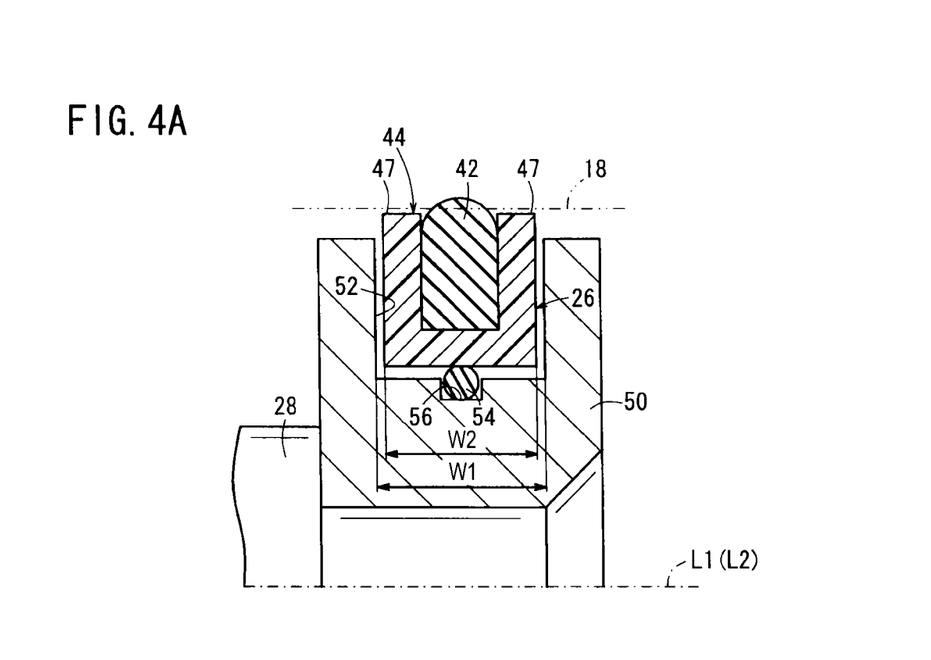
FIG. 4A is a fragmentary cross sectional view of a piston and a packing of a fluid pressure apparatus according to a second embodiment, showing the piston and the packing when the packing is installed in an annular groove, but the piston is not inserted in a slide hole.
Figure 4B:
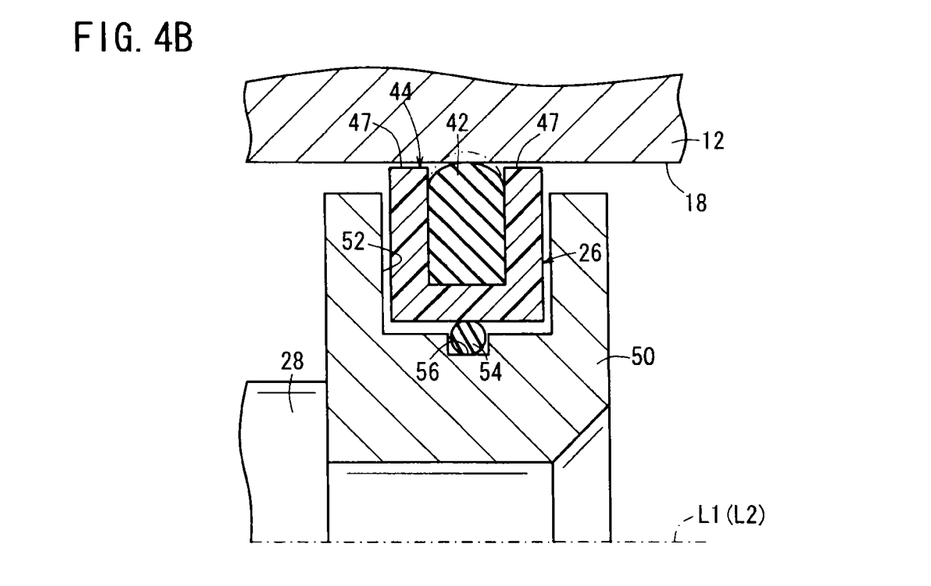
FIG. 4B is a fragmentary cross sectional view of the piston and the packing of the fluid pressure apparatus according to the second embodiment, showing the piston and the packing when a transverse load does not act on the piston.

FIGS. 4A and 4B are fragmentary cross sectional views of a piston 50 and a packing 26 of a fluid pressure apparatus according to a second embodiment. FIG. 4A shows the piston 50 and the packing 26 in a state where the packing 26 is installed in an annular groove but the piston 50 is not inserted into the slide hole 18. FIG. 4B shows the piston 50 and the packing 26 in a state where no transverse load acts on the piston 50.

The packing 26 according to the second embodiment has the same structure as the packing 26 according to the first embodiment. On the outer circumference of the piston 50, there is formed an annular packing installation groove 52 extending circumferentially over the entire circumference around the axis. As shown in FIG. 4B, a ring-shaped second seal member 54 is interposed between the bottom of the packing installation groove 52 and the inner circumference of the packing 26. The second seal member 54 is installed in an annular groove 56 formed at a substantially central portion on the bottom of the packing installation groove 52 in the axial direction. The second seal member 54 may be an o-ring, for example.

The width W1 of the packing installation groove 52 in the axial direction is slightly greater than the width W2 of the support ring 44 in the axial direction. Thus, the support ring 44 is supported by the second seal member 54 on the inner circumferential side, and is tiltably installed in the packing installation groove 52.

As shown in FIG. 4B, in a state in which a transverse load does not act on the piston 50, the axis L1 of the piston 50 substantially coincides with the axis L2 of the slide hole 18. In this case, the seal member 42 is in abutment against the inner circumferential surface of the slide hole 18 over the entire circumference in the circumferential direction, and then is elastically compressed and deformed. On the other hand, since the outer diameter of the support ring 44 is smaller than the inner diameter of the slide hole 18, and the axis L1 of the piston 50 substantially coincides with the axis L2 of the slide hole 18, the support surfaces 47, which are the outer circumferential surface of the support ring 44, are out of contact with the inner circumferential surface of the slide hole 18. Under a state as shown in FIG. 4B, the piston 50 reciprocates along the directions of the axis L of the slide hole 18, and thus the outer circumferential surface of the seal member 42 moves in contact with respect to the inner circumferential surface of the slide hole 18.

Figure 5A:
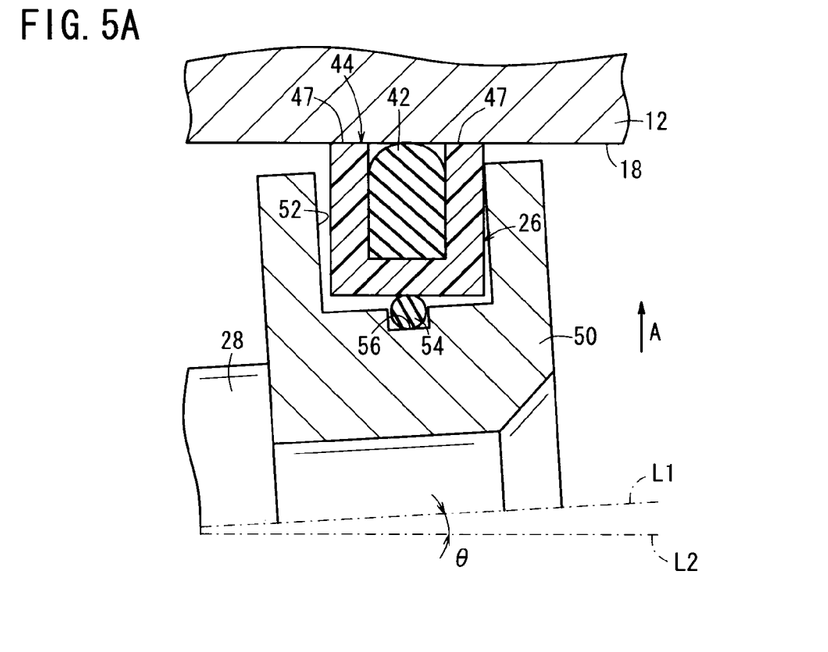
FIG. 5A is a fragmentary cross sectional view of a piston and a packing of a fluid pressure apparatus according to a second embodiment of the present invention, showing the piston and the packing when a small transverse load acts on the piston.

As shown in FIG. 5A, in a case where a small transverse load acts on the piston 50 in the direction indicated by an arrow A, since the seal member 42 is elastically deformable, the support ring 44 is displaced in the direction indicated by the arrow A, and the support surfaces 47 are brought into abutment against the inner circumferential surface of the slide hole 18. In this case, since the support surfaces 47 of the support ring 44 are positioned radially outside the outermost circumference of the piston 50, the outer circumference of the piston 50 is out of contact with the inner circumferential surface of the slide hole 18. Thus, the support ring 44 prevents the piston 50 from contacting with the inner circumferential surface of the slide hole 18.

Also, in this case, the axis L1 of the piston 50 is inclined to the axis L2 of the slide hole 18 at an angle θ, but the axis of the support ring 44 is kept parallel to the axis L2 of the slide hole 18. Thus, even when a small transverse load acts on the piston 50, since the outer circumferential surfaces of the support ring 44 are in surface contact with the inner circumferential surface of the slide hole 18, the sliding resistance therebetween is prevented from excessively increasing, and therefore the piston 50 continues to operate smoothly and stably.

Figure 5B:
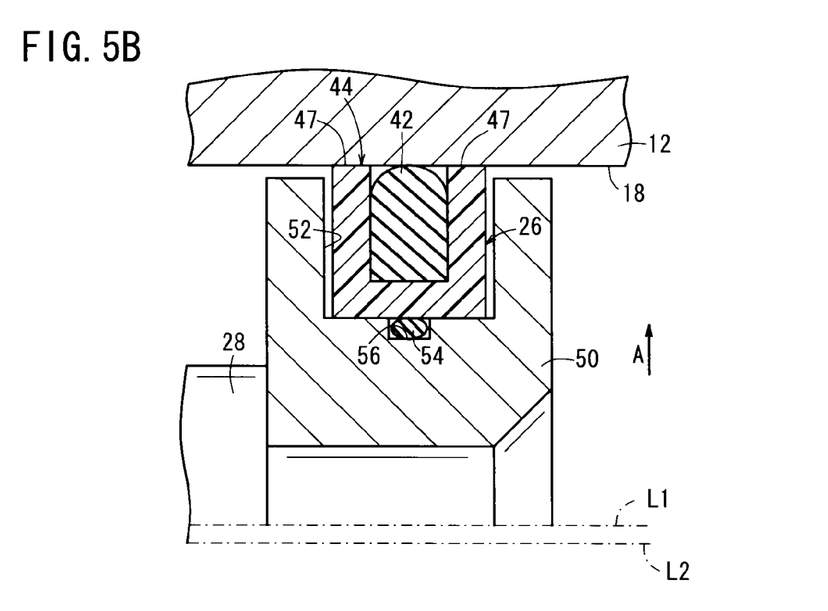
FIG. 5B is a fragmentary cross sectional view of the piston and the packing of the fluid pressure apparatus according to the second embodiment of the present invention, showing the piston and the packing when a large transverse load acts on the piston.

Further, since the second seal member 54 is elastically deformable, in a case in which a large transverse load acts on the piston 50 in the direction indicated by the arrow A, the support ring 44 is further displaced in the direction of the arrow A, and then brought into a state shown in FIG. 5B. More specifically, the bottom of the packing installation groove 52 and the inner circumference of the support ring 44 partially contact with each other in the circumferential direction, and the axis L1 of the piston 50 is parallel to the axis of the support ring 44. In this state, since the support surfaces 47 are positioned radially outside the outermost circumference of the piston 50, the outer circumference of the piston 50 is out of contact with the inner circumferential surface of the slide hole 18. That is, even when a large transverse load acts on the piston 50, the support ring 44 effectively prevents the piston 50 from contacting with the inner circumferential surface of the slide hole 18.

As described above, according to the second embodiment, since the ring-shaped second seal member 54 is interposed between the inner circumferential surface of the support ring 44 and the packing installation groove 52, an interface between the inner circumference of the packing 26 and the groove bottom of the packing installation groove 52 is sealed, whereby flow of fluid therebetween is blocked. Thus, the decrease in efficiency of the fluid pressure apparatus is effectively prevented.

Further, in a case in which a small transverse load acts on the piston 50, the axis L1 of the piston 50 is inclined to the axis L2 of the slide hole 18, but the axis of the support ring 44 is kept parallel to the axis L2 of the slide hole 18. Accordingly, the outer circumferential surface of the support ring 44 is in surface contact with the inner circumferential surface of the slide hole 18. Thus, slide resistance therebetween is prevented from excessively increasing, and therefore the piston 50 continues to operate smoothly and stably.

In the second embodiment, it is a matter of course that the constituent elements which are identical to those of the first embodiment have the same or similar actions and effects as those of the corresponding constituent elements of the first embodiment.

Next, a fluid pressure apparatus according to a third embodiment of the present invention will be described. Constituent elements of the fluid pressure apparatus according to the third embodiment, which have the same or similar functions or effects as those of the fluid pressure apparatus 10 according to the first embodiment, are designated by the same reference characters, and descriptions of such elements have been omitted.

Figure 6A:
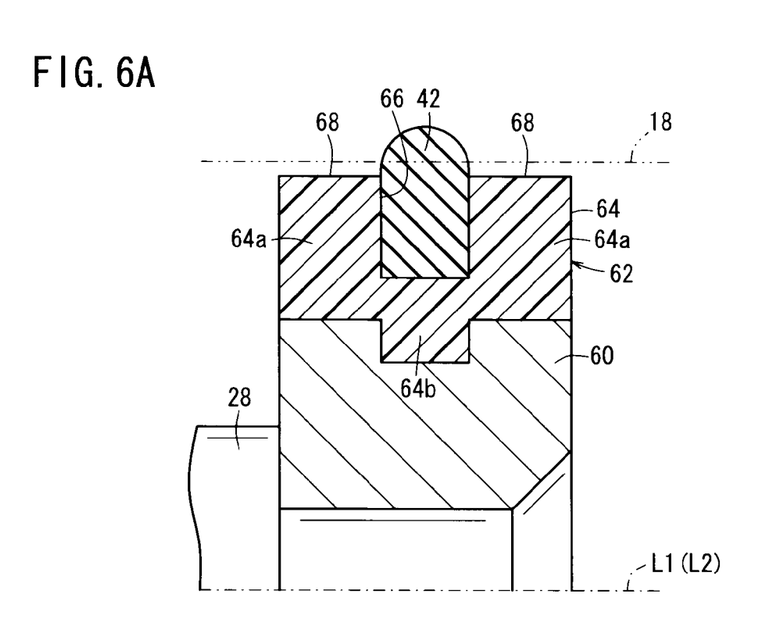
FIG. 6A is a fragmentary cross sectional view of a piston and a packing of a fluid pressure apparatus according to a third embodiment, showing the piston and the packing when the packing is installed in an annular groove, but the piston is not inserted in a slide hole.
Figure 6B:
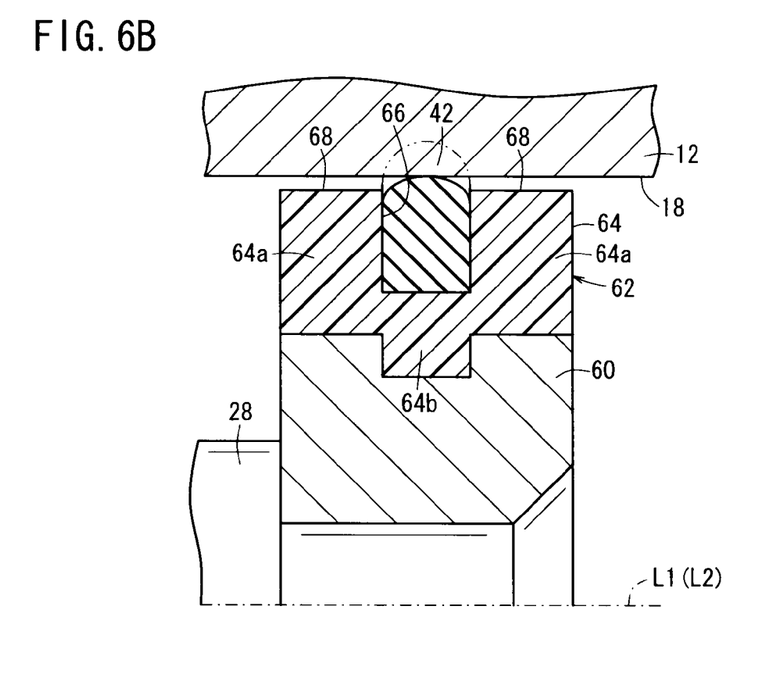
FIG. 6B is a fragmentary cross sectional view of the piston and the packing of the fluid pressure apparatus according to the third embodiment, showing the piston and the packing when a transverse load does not act on the piston.

FIGS. 6A and 6B are fragmentary cross sectional views of a piston 60 and a packing 62 of the fluid pressure apparatus according to the third embodiment. FIG. 6A shows the piston 60 and the packing 62 in a state where the piston 60 is not inserted into the slide hole 18. FIG. 6B shows the piston 60 and the packing 62 when a transverse load does not act on the piston 60.

The packing 62 is made up of a support ring 64 and a seal member 42. The seal member 42 according to the third embodiment is the same in structure as the seal member 42 according to the first embodiment. The support ring 64 is made of a low-friction material like the support ring 44 of the first embodiment. The support ring 64 is formed by combining side walls 64a and a bottom wall 64b integrally, the side walls 64a supporting both sides of the seal member 42, the bottom wall 64b connecting inner ends of both the side walls 64a. The support ring 64 is formed on the outer circumference of the piston 60 concentrically with the piston 60 by mold-forming.

In the support ring 64, there is provided an annular seal installation groove 66 extending circumferentially over the entire circumference of the support ring 64 around the axis thereof, and which is open outwardly in directions of deformation. An outer circumferential surface of each side wall 64a forms a support surface 68. The support surfaces 68 are the outermost circumferential surface of the support ring 64, and are parallel to the axis L1 of the piston 60.

The outer circumference of the seal member 42 protrudes radially outwardly from the support ring 64. Thus, as shown in FIG. 6B, when the piston 60 with the packing 62 installed therein is inserted into the slide hole 18, the seal member 42 is sandwiched between the inner circumferential surface of the slide hole 18 and the bottom of the seal installation groove 66. As a result, the packing 62 is elastically compressed and deformed, and thus is brought into close contact with the inner circumferential surface of the slide hole 18 over the entire circumference thereof in the circumferential direction.

As shown in FIG. 6B, in a state in which a transverse load does not act on the piston 60, the axis L1 of the piston 60 substantially coincides with the axis L2 of the slide hole 18. In this case, the seal member 42 is in abutment against the inner circumferential surface of the slide hole 18 over the entire circumference in the circumferential direction, and then is elastically compressed and deformed. On the other hand, since the outer diameter of the support ring 64 is smaller than the inner diameter of the slide hole 18, and the axis L1 of the piston 60 substantially coincides with the axis L2 of the slide hole 18, the support surfaces 68, which are the outer circumferential surface of the support ring 64, are out of contact with the inner circumferential surface of the slide hole 18. Under a state as shown in FIG. 6B, the piston 60 reciprocates along the directions of the axis L2 of the slide hole 18, and thus the outer circumferential surface of the seal member 42 moves in contact with respect to the inner circumferential surface of the slide hole 18.

Figure 7:
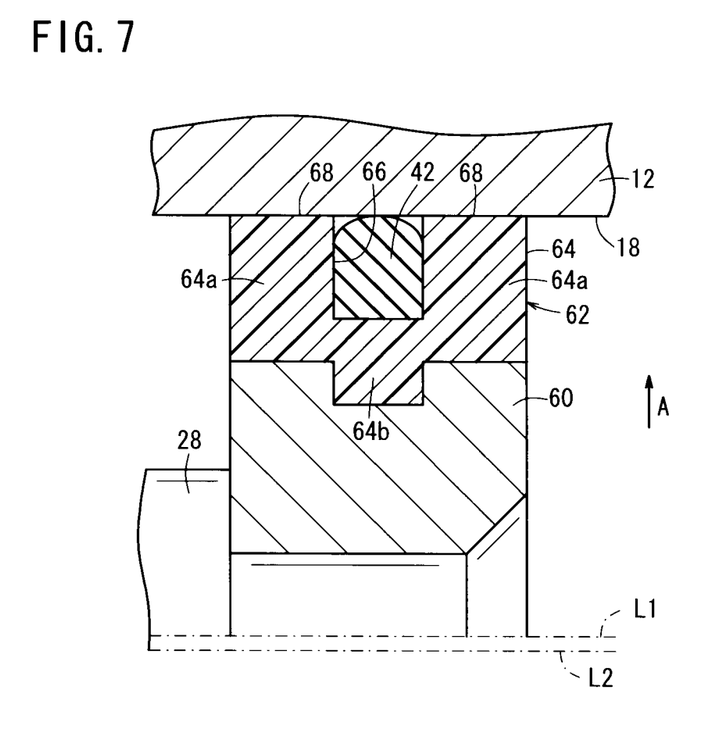
FIG. 7 is a fragmentary cross sectional view of the piston and the packing of the fluid pressure apparatus according to the third embodiment when a transverse load acts on the piston.

As shown in FIG. 7, in a case where at least a certain amount of transverse load acts on the piston 60 in the direction indicated by an arrow A, since the seal member 42 is elastically deformable, the support ring 64 is displaced in the direction indicated by the arrow A, and the support surfaces 68 are brought into abutment against the inner circumferential surface of the slide hole 18. In this case, since the support surfaces 68 of the support ring 64 are positioned radially outside the outermost circumference of the piston 60, the outer circumference of the piston 60 is out of contact with the inner circumferential surface of the slide hole 18. Thus, the support ring 64 prevents the piston 60 from contacting with the inner circumferential surface of the slide hole 18.

In the above-constructed fluid pressure apparatus according to the third embodiment, the support ring 64 is mold-formed. Thus, sealing performance between the outer circumference of the piston 60 and the inner circumference of the support ring 64 is enhanced, and the decrease in efficiency of the fluid pressure apparatus is more effectively prevented.

In the third embodiment, it is a matter of course that the constituent elements which are identical to those of the first embodiment have the same or similar actions and effects as those of the corresponding constituent elements of the first embodiment.

In the foregoing first embodiment, a fluid pressure cylinder 10A has been shown as one example of a fluid pressure apparatus 10. However, the fluid pressure apparatus 10 may also comprise a fluid changeover valve, in which a fluid passage is switched by means of a spool that slides along the interior of a slide hole 18 formed in a housing 12. In this case, the spool forms the partitioning member. Similarly, in the second and third embodiments, the fluid pressure apparatus may also comprise a fluid changeover valve.

Although certain preferred embodiments of the present invention have been shown and described in detail, the present invention is not limited to the embodiment described above, and it should be understood that various changes and modifications may be made therein without departing from the scope of the appended claims.

What is claimed is:

1. A fluid pressure apparatus comprising:
a housing including a slide hole formed therein;
a partitioning member that moves in an axial direction along an interior of the slide hole; and
a packing on an outer circumference of the partitioning member,
wherein the packing includes
a ring-shaped support ring made of a low-friction material and having an annular seal installation groove on an outer circumference side, the support ring having an outer diameter smaller than an inner diameter of the slide hole; and
a ring-shaped seal member made of an elastic material in the seal installation groove, an outer circumference of the seal member protruding outwardly from the support ring and contacting with an inner circumferential surface of the slide hole, wherein
the ring shape of the seal member is formed by a cross sectional area revolved about an axis of revolution, and the cross sectional area includes
a flat radially inward edge that connects flat axially outward edges on a radially inward side of the cross section and
a substantially arcuate shape that connects the flat axially outward edges on a radially outward side of the cross section,
the support ring is formed by integrally combining side walls and a bottom wall, the side walls supporting both sides of the seal member, the bottom wall connecting inner ends of both the side walls, and
when a transverse load does not act on the partitioning member, an axis of the partitioning member and an axis of the slide hole align such that an outer circumferential surface of the support ring is out of contact with the inner circumferential surface of the slide hole, and
when at least a certain amount of transverse load acts on the partitioning member, the axis of the partitioning member and the axis of the slide hole are misaligned such that a portion of the outer circumferential surface of the support ring abuts against the inner circumferential surface of the slide hole and another portion of the outer circumferential surface of the support ring is spaced apart from the inner circumferential surface of the slide hole, whereby the partitioning member is prevented from contacting with the inner circumferential surface of the slide hole, wherein
the support ring is formed on the outer circumference of the partitioning member by mold-forming.

2. A fluid pressure apparatus comprising:
a housing including a slide hole formed therein;
a partitioning member that moves in an axial direction along an interior of the slide hole; and
a packing on an outer circumference of the partitioning member,
wherein the packing includes
a ring-shaped support ring made of a low-friction material and having an annular seal installation groove on an outer circumference side, the support ring having an outer diameter smaller than an inner diameter of the slide hole; and
a ring-shaped seal member made of an elastic material in the seal installation groove, an outer circumference of the seal member protruding outwardly from the support ring and contacting with an inner circumferential surface of the slide hole, wherein the support ring is formed on the outer circumference of the partitioning member by integrally combining side walls and a bottom wall by mold-forming, the side walls supporting both sides of the seal member, the bottom wall connecting inner ends of both the side walls, and when a transverse load does not act on the partitioning member, an axis of the partitioning member and an axis of the slide hole align such that an outer circumferential surface of the support ring is out of contact with the inner circumferential surface of the slide hole, and when at least a certain amount of transverse load acts on the partitioning member, the axis of the partitioning member and the axis of the slide hole are misaligned such that a portion of the outer circumferential surface of the support ring abuts against the inner circumferential surface of the slide hole and another portion of the outer circumferential surface of the support ring is spaced apart from the inner circumferential surface of the slide hole, whereby the partitioning member is prevented from contacting with the inner circumferential surface of the slide hole.

3. The fluid pressure apparatus according to claim 2, wherein outer ends of the side walls of the support ring extend at least as far axially as outer ends of the partitioning member.

4. The fluid pressure apparatus according to claim 2, wherein the partitioning member includes an annular packing installation groove formed in an outer circumference thereof; and the support ring is in the packing installation groove.

5. A fluid pressure apparatus comprising:

a housing including a slide hole formed therein;

a partitioning member that moves in an axial direction along an interior of the slide hole; and a packing on an outer circumference of the partitioning member, wherein the packing includes a ring-shaped support ring made of a low-friction material and having an annular seal installation groove on an outer circumference side, the support ring having an outer diameter smaller than an inner diameter of the slide hole; and a ring-shaped seal member made of an elastic material in the seal installation groove, an outer circumference of the seal member protruding outwardly from the support ring and contacting with an inner circumferential surface of the slide hole, wherein the ring shape of the seal member is formed by a cross sectional area revolved about an axis of revolution, and the cross sectional area includes a flat radially inward edge that connects flat axially outward edges on a radially inward side of the cross section and a substantially arcuate shape that connects the flat axially outward edges on a radially outward side of the cross section, the support ring is formed by integrally combining side walls and a bottom wall, the side walls supporting both sides of the seal member, the bottom wall connecting inner ends of both the side walls, and when a transverse load does not act on the partitioning member, an axis of the partitioning member and an axis of the slide hole align such that an outer circumferential surface of the support ring is out of contact with the inner circumferential surface of the slide hole, and when at least a certain amount of transverse load acts on the partitioning member, the axis of the partitioning member and the axis of the slide hole are misaligned such that a portion of the outer circumferential surface of the support ring abuts against the inner circumferential surface of the slide hole and another portion of the outer circumferential surface of the support ring is spaced apart from the inner circumferential surface of the slide hole, whereby the partitioning member is prevented from contacting with the inner circumferential surface of the slide hole, wherein outer ends of the side walls of the support ring extend at least as far axially as outer ends of the partitioning member.

* * * * *